No. 759,873. PATENTED MAY 17, 1904.
W. EVANS & P. W. KNAUF.
POWER TRANSMISSION DEVICE.
APPLICATION FILED OCT. 17, 1903.
NO MODEL.
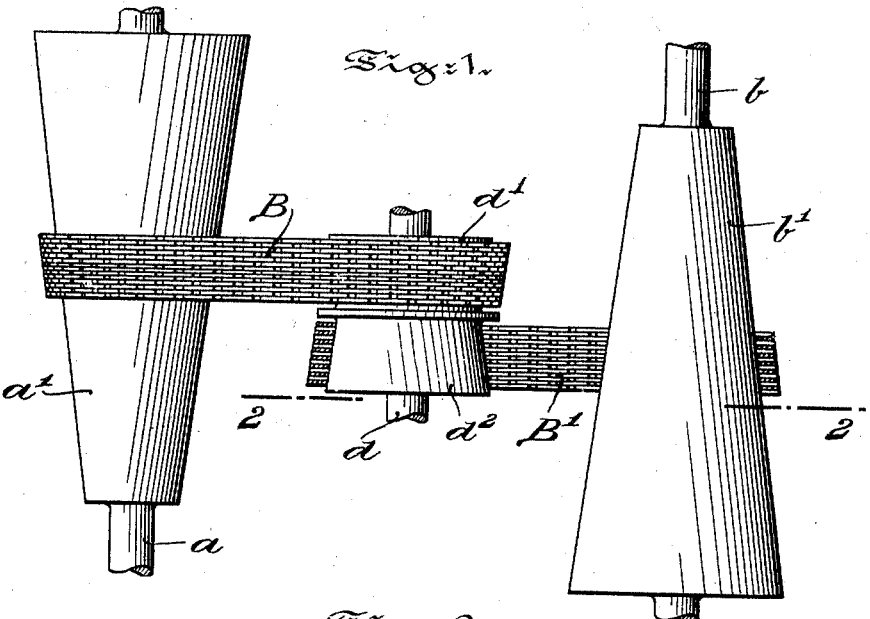
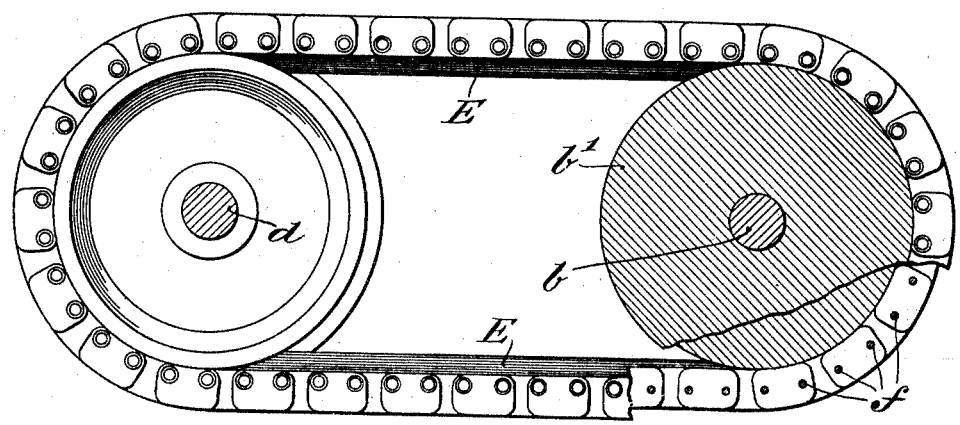
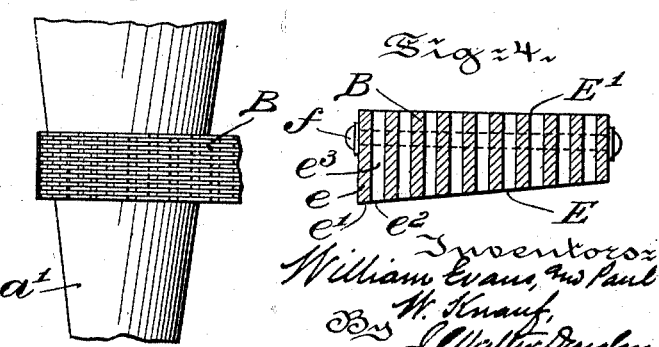

No. 759,873. Patented May 17, 1904.

UNITED STATES PATENT OFFICE.

WILLIAM EVANS AND PAUL W. KNAUF, OF PHILADELPHIA, PENNSYLVANIA; SAID EVANS ASSIGNOR OF HIS RIGHT AND SAID KNAUF ASSIGNOR OF ONE-HALF OF HIS RIGHT TO SAID WILLIAM EVANS, JOHN H. EVANS, AND ROBERT EVANS, OF PHILADELPHIA, PENNSYLVANIA, TRADING AS JOHN EVANS' SONS.

POWER-TRANSMISSION DEVICE.

SPECIFICATION forming part of Letters Patent No. 759,873, dated May 17, 1904.

Application filed October 17, 1903. Serial No. 177,430. (No model.)

*To all whom it may concern:*

Be it known that we, WILLIAM EVANS and PAUL W. KNAUF, both citizens of the United States, residing at the city of Philadelphia, in the county of Philadelphia and State of Pennsylvania, have jointly invented certain new and useful Improvements in Power-Transmission Devices, of which the following is a specification.

Our invention has relation to a device for conveying power from one coned surface to another coned surface, and in such connection it relates more particularly to the arrangement of such a power-transmission device.

Heretofore in connecting coned sufaces with a belt it has been proposed to utilize, in conjunction with a main flat belt, auxiliary wedge-shaped or inclined belts rotating, respectively, on a coned surface between the main belt and cone to fill out the tapered surface of said cone. Thus where two coned surfaces were connected a main flat belt and two auxiliary wedge-shaped belts were necessary.

The principal object of our present invention is to provide a means whereby power may be transferred from one coned surface to another coned surface directly through a belt, the traction-face of which is inclined according to the inclination of the coned surface over which the belt travels and which has sufficient flexibility longitudinally to pass round the coned surfaces without slipping or buckling.

The nature and scope of our invention will be more fully understood from the following description, taken in connection with the accompanying drawings, forming part hereof, in which—

Figure 1 is a top or plan view of a power-transmission device embodying main features of our invention. Fig. 2 is a longitudinal sectional view, enlarged, taken on the line 2 2 of Fig. 1. Fig. 3 is a cross-sectional view, enlarged, of the belt. Fig. 4 is a view corresponding to Fig. 3, but illustrating a modified form of belt; and Fig. 5 is a plan view illustrating a cone and the belt of Fig. 4 passing around the same.

Referring to the drawings, $a$ represents a main or driving shaft having the cone $a'$, and $b$ represents a driven shaft having a cone $b'$ of opposite inclination. Intermediate of the shafts $a$ and $b$ is arranged a shaft $d$, upon which are arranged two oppositely-inclined cones $d'$ and $d^2$. The cone $a'$ and the cone $d'$ have similarly-inclined surfaces, and the cone $b'$ and cone $d^2$ are similarly inclined. A belt B of a construction hereinafter described connects the coned surface $a'$ directly with the coned surface $d'$, and a similar belt B' connects the coned surface $b'$ directly with the coned surface $d^2$. Each belt B or B' consists of a plurality of linked sections arranged in series side by side and with the under or traction face of the sections in series arranged to incline at an angle to the pivots connecting the series of sections laterally—that is to say, one set of sections $e$ (see Figs. 3 and 4) has a traction-face $e'$ projecting below the pintles or pivots $f$ some distance below the corresponding face $e^2$ of the next adjacent set of sections $e^3$, and so on throughout the series, to thus form an inclined traction-face E, the angle of inclination of which is the same as the angle of inclination of a cone over which the belt travels. In arranging the series of sections one set, $e$, breaks joints with the next set, $e^3$, and so on across the belt. Each section by preference is substantially rectangular, with the corners rounded, and two pintles or pivots $f$ traverse each section, as clearly illustrated in Fig. 2, so as to give the necessary flexibility longitudinally to the connected series of sections and to permit them to articulate slightly in running around the coned surfaces $a'$, $d'$, $b'$, and $d^2$.

In Figs. 4 and 5 a modified form of the belt is shown in which the sections are assembled, so that their under or traction face is inclined to the pintles $f$; but the outer face E' is parallel with said pintles $f$ rather than, as in Fig. 3, parallel with the traction-face.

Having thus described the nature and object of our invention, what we claim as new, and desire to secure by Letters Patent, is—

1. In a power-transmission device, a power-shaft having a cone, a driven shaft having a cone oppositely arranged with respect to the power-shaft cone, an intermediate shaft having two oppositely-arranged cones, two belts formed of a plurality of linked sections arranged side by side in series, the under surface of succeeding series of sections being inclined with respect to each other to form an inclined traction-face for each belt, and said belts connecting said driving and driven shafts respectively with the cones of said intermediate shaft.

2. In a power-transmission device, a power-shaft having a cone, a driven shaft having a cone oppositely arranged with respect to the power-shaft cone, an intermediate shaft having two oppositely-arranged cones, a belt having an inclined traction-face connecting one cone of the intermediate shaft directly with the power-shaft cone, and a second belt having an inclined traction-face connecting the other cone of the intermediate shaft directly with the cone of the driven shaft.

3. In a power-transmission device, a power-shaft having a cone, a driven shaft having a cone oppositely arranged with respect to the power-shaft cone, an intermediate shaft having two oppositely-arranged cones, two belts formed of a plurality of linked sections arranged side by side in series, the sections in one series breaking joints with the sections of contiguous series, and the under face of all series of sections being inclined from edge to edge of the belt to form an inclined traction-face for each belt, and said belts connecting said driving and driven shaft respectively with the cones of said intermediate shaft.

4. In a power-transmission device, a power-shaft having a cone, a driven shaft having a cone oppositely arranged with respect to the power-shaft cone, an intermediate shaft having two oppositely-arranged cones, two belts formed of a plurality of linked sections arranged side by side in series, the sections of one series breaking joints with the sections of contiguous series, two pintles or pivots traversing each section to link the series of sections together, and the under face of said sections being inclined with respect to the plane of said pintles to form an inclined traction-face for each belt, and said belts connecting said driving and driven shafts respectively with the cones of said intermediate shaft.

In testimony whereof we have hereunto set our signatures in the presence of two subscribing witnesses.

WILLIAM EVANS.
PAUL W. KNAUF.

Witnesses:
J. WALTER DOUGLASS,
THOMAS M. SMITH.